United States Patent
Lu et al.

(10) Patent No.: US 10,248,350 B2
(45) Date of Patent: Apr. 2, 2019

(54) QUEUE MANAGEMENT METHOD AND APPARATUS

(71) Applicant: Huawei Technologies Co., Ltd., Shenzhen (CN)

(72) Inventors: Yuchun Lu, Beijing (CN); Jian Zhang, Beijing (CN)

(73) Assignee: Huawei Technologies Co., Ltd, Shenzhen (CN)

(*) Notice: Subject to any disclaimer, the term of this patent is extended or adjusted under 35 U.S.C. 154(b) by 70 days.

(21) Appl. No.: 15/425,466

(22) Filed: Feb. 6, 2017

(65) Prior Publication Data

US 2017/0147251 A1    May 25, 2017

Related U.S. Application Data

(63) Continuation of application No. PCT/CN2014/083916, filed on Aug. 7, 2014.

(51) Int. Cl.
    *G06F 3/06* (2006.01)
    *H04L 12/863* (2013.01)
    *H04L 12/879* (2013.01)

(52) U.S. Cl.
    CPC .......... *G06F 3/0631* (2013.01); *G06F 3/0604* (2013.01); *G06F 3/0685* (2013.01); *H04L 47/50* (2013.01); *H04L 49/901* (2013.01)

(58) Field of Classification Search
    CPC .... G06F 3/0604; G06F 3/0611; G06F 3/0631; G06F 3/0656; G06F 3/0685

USPC .......................................... 711/104, 117, 156
See application file for complete search history.

(56) References Cited

U.S. PATENT DOCUMENTS

| | | | |
|---|---|---|---|
| 5,787,255 A | 7/1998 | Parlan et al. | |
| 7,657,706 B2* | 2/2010 | Iyer | G06F 12/0223 711/109 |
| 2002/0010840 A1* | 1/2002 | Barroso | G06F 12/0826 711/141 |
| 2005/0182841 A1 | 8/2005 | Sharp | |
| 2012/0219010 A1 | 8/2012 | Wyatt | |
| 2017/0153852 A1* | 6/2017 | Ma | G06F 3/0604 |

FOREIGN PATENT DOCUMENTS

| | | |
|---|---|---|
| CN | 1595910 A | 3/2005 |
| CN | 101594299 A | 12/2009 |
| CN | 103647726 A | 3/2014 |
| CN | 103731368 A | 4/2014 |

* cited by examiner

*Primary Examiner* — Gary J Portka
(74) *Attorney, Agent, or Firm* — Slater Matsil, LLP

(57) ABSTRACT

Embodiments of the present invention disclose a queue management method. The method includes writing a PD queue to a DRAM, where the PD queue includes multiple PDs, and the multiple PDs correspond one-to-one to multiple packets included in a first packet queue. The method also includes writing at least one PD in the PD queue to an SRAM, where the at least one PD includes a queue head of the PD queue. Correspondingly, the embodiments of the present invention further disclose a queue management apparatus.

18 Claims, 4 Drawing Sheets

QUEUE MANAGEMENT METHOD AND APPARATUS

CROSS-REFERENCE TO RELATED APPLICATIONS

This application is a continuation of International Application No. PCT/CN2014/083916, filed on Aug. 7, 2014, the disclosure of which is hereby incorporated by reference in its entirety.

TECHNICAL FIELD

Embodiments of the present invention relate to the communications field, and in particular, to a queue management method and apparatus.

BACKGROUND

A demand for increasing network bandwidth imposes a higher requirement on a capacity and integration of a router. A rate of a single line card (LC for short) of a router evolves from 10 gigabits per second (Gbps for short), 40 Gbps, 100 Gbps, or 200 Gbps to 400 Gbps or even higher. A processing capability of a single line card of the router also evolves from 15 mega packets per second (Mpps for short), 60 Mpps, 150 Mpps, or 300 Mpps to 600 Mpps or even higher, which poses a challenge for a rate of a memory of the line card of the router.

Scheduling a packet queue (including packet enqueuing and packet dequeuing) may be implemented by accessing a packet descriptor (PD for short) queue corresponding to the packet queue (including performing a read operation and a write operation on the PD queue). In the prior art, the PD queue is stored in a dynamic random access memory (DRAM for short). Therefore, scheduling the packet queue needs to be implemented by performing a read operation and a write operation on the DRAM. During access to the DRAM, a rate of access to the DRAM is restricted by a property of the DRAM. For example, a rate of the packet queue is 300 MPPS, a row cycle time (tRC for short) of the DRAM is approximately 40-50 nanoseconds (ns for short), and the rate of access to the DRAM is approximately 25 MPPS. Even if the rate of access to the DRAM can be improved to 100 MPPS, a requirement of the rate of the packet queue, that is, 300 MPPS, still cannot be met. In the foregoing technical solutions, a rate of performing a read operation on a PD queue is restricted by a property of a DRAM, which affects dequeuing efficiency of a packet queue.

SUMMARY

Embodiments of the present invention provide a method and an apparatus for managing control information of a queue, which can resolve a problem in the prior art that limitations of a capacity of a DRAM and bandwidth affect dequeuing efficiency of a packet queue.

According to a first aspect, a queue management method is provided. The method includes: writing a PD queue to a DRAM, where the PD queue includes multiple PDs, and the multiple PDs correspond one-to-one to multiple packets included in a first packet queue. The method also includes writing at least one PD in the PD queue to a static random access memory (SRAM for short), where the at least one PD includes a queue head of the PD queue.

With reference to the first aspect, in a first possible implementation manner, after the writing a PD queue to a DRAM, and before the writing at least one PD in the PD queue to an SRAM, the method further includes: determining that a credit of the first packet queue is greater than or equal to a preset first threshold, and a capacity of available storage space in the SRAM is greater than or equal to a preset second threshold; and the writing at least one PD in the PD queue to an SRAM specifically includes: if the capacity of the available storage space in the SRAM is greater than or equal to the second threshold, writing the at least one PD in the PD queue to the SRAM.

With reference to the first possible implementation manner of the first aspect, in a second possible implementation manner, the determining that a credit of the first packet queue is greater than or equal to a preset first threshold, and a capacity of available storage space in the SRAM is greater than or equal to a preset second threshold further includes: determining that a to-be-activated packet queue set is empty, where the to-be-activated packet queue set includes a packet queue that meets a preset waiting-for-activation condition, and the waiting-for-activation condition is that when the determining is performed, a credit of a packet queue is greater than or equal to the first threshold, and when the determining is performed, the capacity of the available storage space in the SRAM is less than the second threshold; and the writing at least one PD in the PD queue to an SRAM specifically includes: if the capacity of the available storage space in the SRAM is greater than or equal to the second threshold, and the to-be-activated packet queue set is empty, writing the at least one PD in the PD queue to the SRAM.

With reference to the first possible implementation manner, in a third possible implementation manner, the determining that a credit of the first packet queue is greater than or equal to a preset first threshold, and a capacity of available storage space in the SRAM is greater than or equal to a preset second threshold further includes: determining that a to-be-activated packet queue set is non-empty, where the to-be-activated packet queue set includes a packet queue that meets a preset waiting-for-activation condition, and the waiting-for-activation condition is that when the determining is performed, a credit of a packet queue is greater than or equal to the first threshold, and when the determining is performed, the capacity of the available storage space in the SRAM is less than the second threshold; and the writing at least one PD in the PD queue to an SRAM specifically includes: if the capacity of the available storage space in the SRAM is greater than or equal to the second threshold, and the first packet queue is a packet queue with a highest priority in the to-be-activated packet queue set, writing the at least one PD in the PD queue to the SRAM.

With reference to the second or the third possible implementation manner, in a fourth possible implementation manner, the writing a PD queue to a DRAM further includes: identifying a state of the first packet queue as a first state; the determining that a credit of the first packet queue is greater than or equal to a preset first threshold, and a capacity of available storage space in the SRAM is greater than or equal to a preset second threshold further includes: changing the state of the first packet queue to a second state; and the writing at least one PD in the PD queue to an SRAM specifically includes: writing the at least one PD in the PD queue to the SRAM based on an indication of the second state.

With reference to the fourth possible implementation manner, in a fifth possible implementation manner, the method further includes: if the credit of the first packet queue is greater than or equal to the first threshold, and the capacity of the available storage space in the SRAM is less than the second threshold, changing the state of the first packet queue to a third state; and adding the first packet queue in the third state to the to-be-activated packet queue set.

With reference to any one of the first aspect to the fifth possible implementation manner, in a sixth possible implementation manner, the method further includes: determining whether a to-be-enqueued packet in a second packet queue meets a preset fast packet identification condition; and if the to-be-enqueued packet does not meet the preset fast packet identification condition, writing a PD of the to-be-enqueued packet to the DRAM; or if the to-be-enqueued packet meets the preset fast packet identification condition, writing a PD of the to-be-enqueued packet to the SRAM.

With reference to any one of the first aspect to the sixth possible implementation manner, in a seventh possible implementation manner, the DRAM includes multiple storage banks, multiple PD queues corresponding to multiple packet queues are stored in the DRAM, multiple queue heads of the multiple PD queues are respectively stored in multiple banks, the multiple queue heads correspond one-to-one to the multiple banks, and the multiple PD queues correspond one-to-one to the multiple queue heads.

With reference to the seventh possible implementation manner, in an eighth possible implementation manner, the method further includes: executing a dequeue operation on at least two packet queues in the multiple packet queues according to the multiple queue heads stored in the multiple banks.

With reference to the seventh possible implementation manner, in a ninth possible implementation manner, the method further includes: executing a dequeue operation on at least two PD queues in the multiple PD queues, where after the dequeue operation is performed, the at least two PD queues separately include at least two new queue heads; and if the at least two new queue heads are stored in a same bank, and at least two dequeuing requests are received, placing the at least two dequeuing requests in a dequeuing request queue corresponding to the same bank, and using the dequeuing request queue to respond to the at least two dequeuing requests, where the at least two dequeuing requests correspond one-to-one to the at least two PD queues.

According to a second aspect, a queue management apparatus is provided. The apparatus includes: a first writing module, configured to write a PD queue to a DRAM, where the PD queue includes multiple PDs, and the multiple PDs correspond one-to-one to multiple packets included in a first packet queue. The apparatus also includes a second writing module, configured to write, to an SRAM, at least one PD in the PD queue written by the first writing module, where the at least one PD includes a queue head of the PD queue.

With reference to the second aspect, in a first possible implementation manner, the apparatus further includes: a first determining module, configured to: after the first writing module writes the PD queue to the DRAM, and before the second writing module writes the at least one PD in the PD queue to the SRM, determine that a credit of the first packet queue is greater than or equal to a preset first threshold, and a capacity of available storage space in the SRAM is greater than or equal to a preset second threshold; where the second writing module is specifically configured to: if the capacity of the available storage space in the SRAM is greater than or equal to the second threshold, write the at least one PD in the PD queue to the SRAM.

With reference to the first possible implementation manner of the second aspect, in a second possible implementation manner, the first determining module is further configured to: determine that a to-be-activated packet queue set is empty, where the to-be-activated packet queue set includes a packet queue that meets a preset waiting-for-activation condition, and the waiting-for-activation condition is that when the determining is performed, a credit of a packet queue is greater than or equal to the first threshold, and when the determining is performed, the capacity of the available storage space in the SRAM is less than the second threshold; and the second writing module is specifically configured to: if the capacity of the available storage space in the SRAM is greater than or equal to the second threshold, and the to-be-activated packet queue set is empty, write the at least one PD in the PD queue to the SRAM.

With reference to the first possible implementation manner of the second aspect, in a third possible implementation manner, the first determining module is further configured to: determine that a to-be-activated packet queue set is non-empty, where the to-be-activated packet queue set includes a packet queue that meets a preset waiting-for-activation condition, and the waiting-for-activation condition is that when the determining is performed, a credit of a packet queue is greater than or equal to the first threshold, and when the determining is performed, the capacity of the available storage space in the SRAM is less than the second threshold; and the second writing module is specifically configured to: if the capacity of the available storage space in the SRAM is greater than or equal to the second threshold, and the first packet queue is a packet queue with a highest priority in the to-be-activated packet queue set, write the at least one PD in the PD queue to the SRAM.

With reference to the second or the third possible implementation manner of the second aspect, in a fourth possible implementation manner, the first writing module is further configured to: identify a state of the first packet queue as a first state; the first determining module is further configured to: change the state of the first packet queue to a second state; and the second writing module is specifically configured to write the at least one PD in the PD queue to the SRAM based on an indication of the second state.

With reference to the fourth possible implementation manner of the second aspect, in a fifth possible implementation manner, the apparatus further includes: a modifying module, configured to: if the credit of the first packet queue is greater than or equal to the first threshold, and the capacity of the available storage space in the SRAM is less than the second threshold, change the state of the first packet queue to a third state; and an adding module, configured to add the first packet queue in the third state to the to-be-activated packet queue set.

With reference to any one of the second aspect to the fifth possible implementation manner, in a sixth possible implementation manner, the apparatus further includes: a second determining module, configured to determine whether a to-be-enqueued packet in a second packet queue meets a preset fast packet identification condition; and a third writing module, configured to: if the second determining module determines that the to-be-enqueued packet does not meet the preset fast packet identification condition, write a PD of the to-be-enqueued packet to the DRAM; or a fourth writing module, configured to: if the second determining module determines that the to-be-enqueued packet meets the preset fast packet identification condition, write a PD of the to-be-enqueued packet to the SRAM.

With reference to any one of the second aspect to the sixth possible implementation manner, in a seventh possible implementation manner, the DRAM includes multiple banks, multiple PD queues corresponding to multiple packet queues are stored in the DRAM, multiple queue heads of the multiple PD queues are respectively stored in multiple banks, the multiple queue heads correspond one-to-one to the multiple banks, and the multiple PD queues correspond one-to-one to the multiple queue heads.

With reference to the seventh possible implementation manner of the second aspect, in an eighth possible implementation manner, the apparatus further includes: a first dequeuing module, configured to perform a dequeue operation on at least two packet queues in the multiple packet queues according to the multiple queue heads stored in the multiple banks.

With reference to the seventh possible implementation manner of the second aspect, in a ninth possible implementation manner, the apparatus further includes: a second dequeuing module, configured to perform a dequeue operation on at least two PD queues in the multiple PD queues, where after the dequeue operation is performed, the at least two PD queues separately include at least two new queue heads; and a responding module, configured to: if the at least two new queue heads are stored in a same bank, and at least two dequeuing requests are received, place the at least two dequeuing requests in a dequeuing request queue corresponding to the same bank, and use the dequeuing request queue to respond to the at least two dequeuing requests, where the at least two dequeuing requests correspond one-to-one to the at least two PD queues.

The foregoing technical solutions have the following beneficial effects.

In the foregoing technical solutions, a PD queue corresponding to a first packet queue is written to a DRAM, and at least one PD that is in the PD queue and includes a queue head is written to an SRAM. Therefore, at least one PD in the PD queue corresponding to the first packet queue is stored in the SRAM. Performing a dequeue operation on the first packet queue may be implemented by performing a read operation on the PD queue. If the first packet queue is a first in first out (FIFO for short) queue, a dequeue operation on the first packet queue may be implemented by executing a read operation on the queue head of the PD queue. The queue head of the PD queue is stored in the SRAM, and executing a read operation on the queue head of the PD queue is implemented by performing a read operation on the SRAM. A rate of performing a read operation on the SRAM is not restricted by a property of the DRAM. Therefore, in the foregoing technical solutions, dequeuing efficiency of a PD queue is relatively high, which helps to improve dequeuing efficiency of a first packet queue.

BRIEF DESCRIPTION OF THE DRAWINGS

To describe the technical solutions in the embodiments of the present invention more clearly, the following briefly describes the accompanying drawings that need to be used in the embodiments. Apparently, the accompanying drawings in the following description show merely some embodiments of the present invention. A person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Unless otherwise specified, packet queues involved in the embodiments of the present invention may all be FIFO queues. Both a queue management apparatus and an execution body of a queue management method provided in the embodiments of the present invention may be memory controllers. For example, a memory controller can control a DRAM and an SRAM. Further, both the queue management apparatus and the execution body of the queue management method provided in the embodiments of the present invention may be traffic management chips. The traffic management chip includes the memory controller. For example, the traffic management chip may be coupled to the DRAM by using the memory controller. For example, the traffic management chip may be coupled to the SRAM by using the memory controller. Further, both the queue management apparatus and the execution body of the queue management method provided in the embodiments of the present invention may be LCs. The LC includes the traffic management chip. Further, both the queue management apparatus and the execution body of the queue management method provided in the embodiments of the present invention may be network devices. The network device includes the line card. The network device may be a router, a network switch, a firewall, a load balancer, a data center, a base station, a packet transport network (PTN for short) device, or a wavelength division multiplexing (WDM for short) device.

Unless otherwise specified, a PD involved in the embodiments of the present invention may include a storage address of a corresponding packet or a pointer that is used to point to a corresponding packet. In addition, the PD may further include time at which the corresponding packet is received. In addition, the PD may further include a packet header of the corresponding packet.

Unless otherwise specified, a packet queue involved in the embodiments of the present invention may be stored in a DRAM or an SRAM. A storage location of the packet queue is not limited in the embodiments of the present invention.

Figure 1:
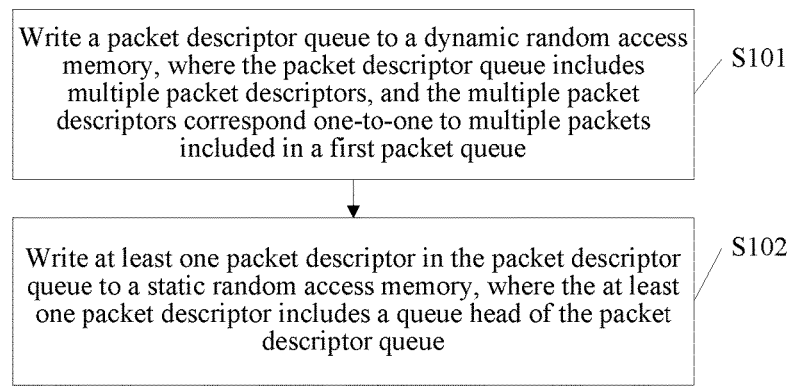
FIG. 1 is a schematic flowchart of a queue management method according to an embodiment of the present invention.

Referring to FIG. 1, FIG. 1 is a schematic flowchart of a queue management method according to an embodiment of the present invention. The method includes the following steps.

S101. Write a PD queue to a DRAM, where the PD queue includes multiple PDs, and the multiple PDs correspond one-to-one to multiple packets included in a first packet queue.

Specifically, the first packet queue is associated with the PD queue. A quantity of packets included in the first packet queue is equal to a quantity of PDs included in the PD queue. The multiple packets in the first packet queue correspond one-to-one to the multiple PDs in the PD queue. For example, a traffic management chip writes, to the DRAM, the PD queue corresponding to the first packet queue.

For example, the first packet queue includes eight packets. There are also eight PDs in the PD queue associated with the first packet queue. The eight packets in the first packet queue correspond one-to-one to the eight PDs in the PD queue. For example, the traffic management chip writes the PD queue to the DRAM.

S102. Write at least one PD in the PD queue to an SRAM, where the at least one PD includes a queue head of the PD queue.

Specifically, the traffic management chip writes, to the SRAM, the at least one PD in the PD queue corresponding to the first packet queue. The at least one PD that is written includes the queue head of the PD queue. A PD corresponding to the queue head of the PD queue is used to describe a packet corresponding to a queue head of the first packet queue. The packet corresponding to the queue head of the first packet queue is a packet in the multiple packets that is first received.

For example, S102 may further include: deleting the at least one PD from the DRAM. The PD queue is stored in the SRAM and the DRAM.

Optionally, after the writing a PD queue to a DRAM, and before the writing at least one PD in the PD queue to an SRAM, the method further includes: determining that a credit of the first packet queue is greater than or equal to a preset first threshold, and a capacity of available storage space in the SRAM is greater than or equal to a preset second threshold; and the writing at least one PD in the PD queue to an SRAM specifically includes: if the capacity of the available storage space in the SRAM is greater than or equal to the second threshold, writing the at least one PD in the PD queue to the SRAM.

Specifically, the credit of the first packet queue may be used to indicate a quantity of packets that can dequeue from the first packet queue or a quantity of bytes of packets that can dequeue from the first packet queue. The traffic management chip may obtain the credit of the first packet queue from a queue descriptor (QD for short) of the first packet queue. The QD is used to describe the first packet queue. For the QD, refer to Table 3. The traffic management chip determines whether the credit of the first packet queue is greater than or equal to the preset first threshold, and determines whether the capacity of the available storage space in the SRAM is greater than or equal to the preset second threshold. If it is determined that the credit of the first packet queue is greater than or equal to the preset first threshold, and the capacity of the available storage space in the SRAM is greater than or equal to the preset second threshold, S102 is performed.

For example, the preset first threshold may be determined according to one or more of the following: a priority, a queue length, and a sleep period that are of the first packet queue, a quantity of packets in the first packet queue, and the capacity of the available storage space in the SRAM. For example, for the first packet queue, a higher priority, a longer queue, more packets, or a longer sleep period indicates a smaller first threshold that can be preset. Conversely, for the first packet queue, a lower priority, a shorter queue, less packets, or a shorter sleep period indicates a larger first threshold that can be preset.

For example, when the first threshold is used to identify the quantity of packets that can dequeue from the first packet queue, the first threshold may be greater than or equal to 1. When the first threshold is used to identify the quantity of bytes of packets that can dequeue from the first packet queue, the first threshold may be greater than or equal to a quantity of bytes of one packet in the first packet queue.

For example, the preset second threshold is greater than or equal to a size of one PD in the PD queue. In this case, the at least one PD in the PD queue may be written to the SRAM. To write a PD in the PD queue to the SRAM, a write operation is performed according to a first in first out principle. The queue head of the PD queue is first written to the SRAM, and a queue tail is last written to the SRAM.

For example, a size of each PD in the PD queue is eight bytes, the preset second threshold is eight bytes, and the capacity of the available storage space in the SRAM is 25 bytes. In this case, the capacity of the available storage space in the SRAM is greater than the second threshold, and a maximum of three PDs may be written to the available storage space in the SRAM. Before a write operation is performed, the PD queue includes eight PDs. After the foregoing capacity limit condition is met, the traffic management chip may write the first three PDs in the PD queue to the SRAM.

Optionally, in some embodiments of the present invention, the determining that a credit of the first packet queue is greater than or equal to a preset first threshold, and a capacity of available storage space in the SRAM is greater than or equal to a preset second threshold further includes: determining that a to-be-activated packet queue set is empty, where the to-be-activated packet queue set includes a packet queue that meets a preset waiting-for-activation condition, and the waiting-for-activation condition is that when the determining is performed, a credit of a packet queue is greater than or equal to the first threshold, and when the determining is performed, the capacity of the available storage space in the SRAM is less than the second threshold; and the writing at least one PD in the PD queue to an SRAM specifically includes: if the capacity of the available storage space in the SRAM is greater than or equal to the second threshold, and the to-be-activated packet queue set is empty, writing the at least one PD in the PD queue to the SRAM.

Specifically, the traffic management chip may maintain a to-be-activated packet queue set. The to-be-activated packet queue set includes a packet queue that meets a preset waiting-for-activation condition. The waiting-for-activation condition is that when the determining is performed, a credit of a packet queue is greater than or equal to the first threshold, and when the determining is performed, the available storage space in the SRAM is less than the second threshold. The to-be-activated packet queue set may include zero, one, or more to-be-activated packet queues. Each to-be-activated packet queue is corresponding to a priority. A priority of a to-be-activated packet queue is used to indicate a sequence for writing, to the SRAM, at least one PD in a PD queue corresponding to the to-be-activated packet queue. At least one PD in a PD queue corresponding to a to-be-activated packet queue with a higher priority is written to the SRAM prior to at least one PD in a PD queue corresponding to a to-be-activated packet queue with a lower priority. Each at least one PD includes a queue head of a corresponding PD queue. That the to-be-activated packet queue set is empty indicates that a quantity of to-be-activated packet queues in the to-be-activated packet queue set is 0. That the to-be-activated packet queue set is non-empty indicates that the quantity of to-be-activated packet queues in the to-be-activated packet queue set is greater than 0.

Figure 2:
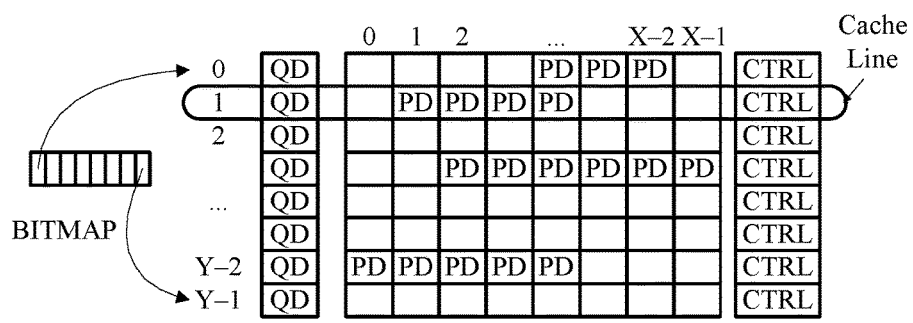
FIG. 2 is a schematic diagram of a data structure of an SRAM in FIG. 1.
Figure 3:
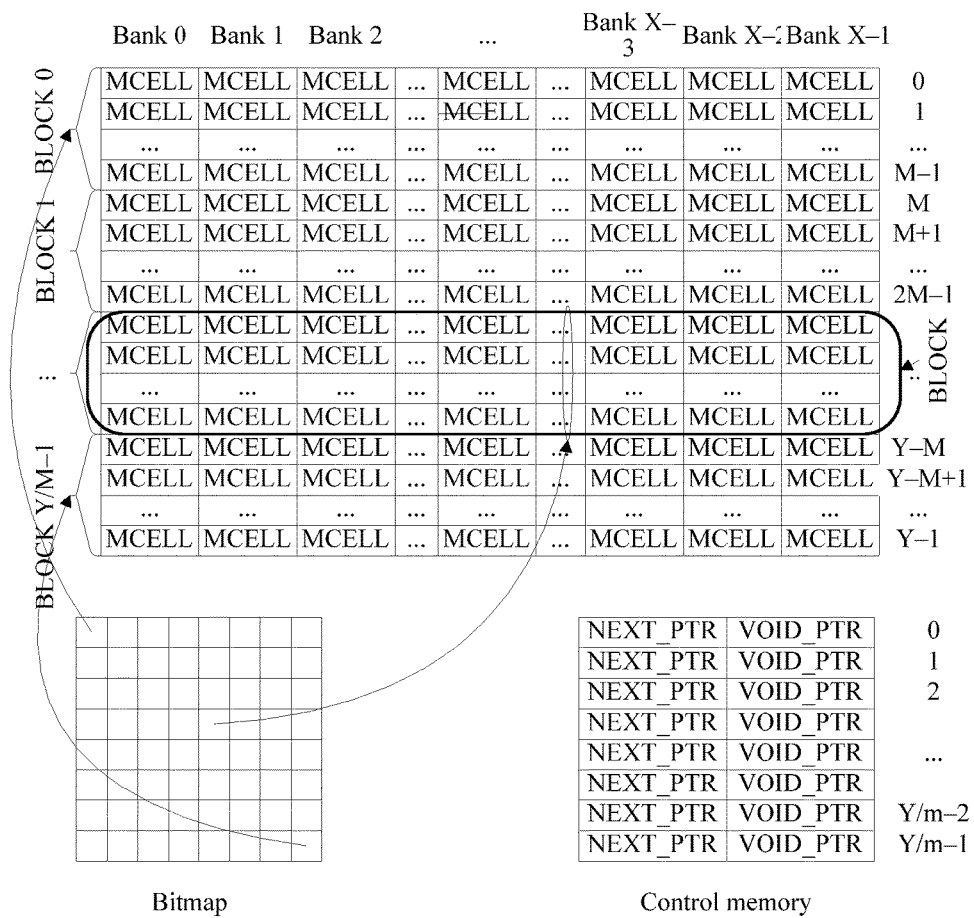
FIG. 3 is a schematic diagram of a data structure of a DRAM in FIG. 1.

For example, as shown in FIG. 2, the SRAM is managed in a form of a Cache Line. The SRAM is formed by Y Cache Lines, and each Cache Line has one optional QD cache space, X PD cache spaces, and one CTRL entry that is used to manage the Cache Line. In addition, each Cache Line is further associated with one BITMAP entry that indicates property information of the Cache Line. Each Cache Line can be occupied by only one PD queue, and one PD queue may occupy multiple Cache Lines. PDs in each Cache Line are sequentially stored to form a segment of a linked list, multiple Cache Lines are connected by using N_PTR pointers in CTRL entries, to form a singly linked list, the singly linked list forms a queue head of a PD queue of a packet queue, and the part of the queue head is connected, by using an HH_PTR pointer in a CTRL entry, to a part of a queue tail of the PD queue that is of the packet queue and is stored in the DRAM. CTRL entries of a PD queue that occupy multiple Cache Lines are stored in Cache Lines in the first row.

Table 1 shows an example of a CTRL entry, and Table 2 shows an example of a BITMAP entry.

TABLE 1

| Name | Length (in bits) | Remarks |
|---|---|---|
| H_PTR | 11 | A queue head pointer of a PD queue in a cache (cache) |
| T_PTR | 11 | A queue tail pointer of a PD queue in a cache (cache) |
| N_PTR | 8 | A pointer that points to a next cache Line |
| HH_PTR | 25 | A queue head pointer of a PD queue in a memory (buffer) |
| CNT | 11 | A quantity of PDs being returned to a cache when a pre-reading request has been sent |
| NUM | 11 | A quantity of PDs in a PD cache (cache) |
| FQ_ID | 19 | A sequence number of a flow queue to which a cache Line belongs |
| CREDIT_DEFICIT | 21 | A quantity of credits that need to be obtained back from a PD memory (buffer) (credit-based scheduling) |
|  | 11 | A quantity of PDs that need to be obtained back from a PD memory (buffer) (packet-based scheduling) |
| AVG_PLEN | 14 | An average packet length of a flow queue |
| PKT_BITMAP | 8 | A BITMAP indicates whether a packet corresponding to a PD already exists in a packet cache |
| Total | 129/139 |  |

TABLE 2

| Name | Depth | Remarks |
|---|---|---|
| H_RDY_BITMAP | 256 | A queue head PD in a cache line may dequeue |
| VALID_BITMAP | 256 | A cache line is idle |
| PD_FETCH_BITMAP | 256 | A PD needs to be prefetched for an active queue in a cache Line |
| SP_BITMAP | 256 | An active queue in a cache line is a queue with an absolute priority |
| EXTENDED_BITMAP | 256*4 | An extended BITMAP |

The traffic management chip may determine, by using VALID_BITMAP in a BITMAP entry, whether a Cache Line in the SRAM is available. For example, 1 indicates availability, and 0 indicates being occupied. For example, it is assumed that a Cache Line in the first row in the SRAM is in an available state, the second threshold is a size of one PD, a capacity of available storage space in the Cache Line in the first row is eight PDs and is greater than the second threshold, the traffic management chip allocates the Cache Line in the first row to the first packet queue, and eight PDs and one QD can be stored respectively in a PD cache space and a QD cache space in the Cache Line in the first row. In this case, the eight PDs in the first packet queue may be written to the Cache Line in the first row in the SRAM.

Optionally, in some embodiments of the present invention, the determining that a credit of the first packet queue is greater than or equal to a preset first threshold, and a capacity of available storage space in the SRAM is greater than or equal to a preset second threshold further includes: determining that a to-be-activated packet queue set is non-empty, where the to-be-activated packet queue set includes a packet queue that meets a preset waiting-for-activation condition, and the waiting-for-activation condition is that when the determining is performed, a credit of a packet queue is greater than or equal to the first threshold, and when the determining is performed, the capacity of the available storage space in the SRAM is less than the second threshold; and the writing at least one PD in the PD queue to an SRAM specifically includes: if the capacity of the available storage space in the SRAM is greater than or equal to the second threshold, and the first packet queue is a packet queue with a highest priority in the to-be-activated packet queue set, writing the at least one PD in the PD queue to the SRAM.

Specifically, the traffic management chip maintains a to-be-activated packet queue set. The to-be-activated packet queue set includes a packet queue that meets a preset waiting-for-activation condition. The waiting-for-activation condition is that when the determining is performed, a credit of a packet queue is greater than or equal to the first threshold, and when the determining is performed, the available storage space in the SRAM is less than the second threshold. The to-be-activated packet queue set may include zero, one, or more to-be-activated packet queues. Each to-be-activated packet queue is corresponding to a priority. A priority of a to-be-activated packet queue is used to indicate a sequence for writing, to the SRAM, at least one PD in a PD queue corresponding to the to-be-activated packet queue. At least one PD in a PD queue corresponding to a to-be-activated packet queue with a higher priority is written to the SRAM prior to at least one PD in a PD queue corresponding to a to-be-activated packet queue with a lower priority. Each at least one PD includes a queue head of a corresponding PD queue. That the to-be-activated packet queue set is empty indicates that a quantity of to-be-activated packet queues in the to-be-activated packet queue set is 0. That the to-be-activated packet queue set is non-empty indicates that the quantity of to-be-activated packet queues in the to-be-activated packet queue set is greater than 0.

If the first packet queue is a packet queue with a highest priority in the to-be-activated packet queue set, that is, the first packet queue is located at a head of a to-be-activated packet queue, at least one PD in the PD queue associated with the first packet queue is written to the SRAM, where the at least one PD includes the queue head of the first packet queue.

Optionally, the writing a PD queue to a DRAM further includes: identifying a state of the first packet queue as a first state; the determining that a credit of the first packet queue is greater than or equal to a preset first threshold, and a capacity of available storage space in the SRAM is greater than or equal to a preset second threshold further includes: changing the state of the first packet queue to a second state; and the writing at least one PD in the PD queue to an SRAM specifically includes: writing the at least one PD in the PD queue to the SRAM based on an indication of the second state.

Specifically, the state of the first packet queue includes the first state and the second state. The first state indicates that the entire PD queue associated with the first packet queue is stored in the DRAM, and the second state indicates that some PDs in the PD queue associated with the first packet queue are stored in the SRAM and other PDs are stored in the DRAM, or the entire PD queue associated with the first packet queue is stored in the SRAM.

For example, a quantity of PDs in the PD queue associated with the first packet queue is 32. If 28 PDs in the PD queue are stored in the DRAM and four PDs are stored in the SRAM, or the 32 PDs are all stored in the SRAM, it indicates that the first packet queue is in the second state. If the 32 PDs in the PD queue are all stored in the DRAM, it indicates that the first packet queue is in the first state. Table 3 shows an example of a QD of a queue, and Table 4 shows an example of a PD of a packet in a queue.

The traffic management chip determines that the credit of the first packet queue is greater than or equal to the preset first threshold, and the capacity of the available storage space in the SRAM is greater than or equal to the preset second threshold; and determines that a to-be-activated packet queue set is empty, and changes the state of the first packet queue to the second state. The traffic management chip may obtain the credit of the first packet queue and a state of the to-be-activated packet queue set from a latest QD, and obtain, from a CTRL entry, an available state of storage space in the SRAM. Table 3 is a schematic diagram of a QD, and Table 4 is a schematic diagram of a PD.

TABLE 3

| Name | Length (in bits) | Access times Enqueuing | Access times Dequeuing | Remarks |
|---|---|---|---|---|
| HEAD_PTR | 25 | | Read once and write once | An address of a queue head PD in a PD queue associated with a packet queue |
| TAIL_PTR | 25 | Read once and write once | | An address of a queue tail PD in a PD queue associated with a packet queue |
| Q_LEN | 28 | Read once and write once | Read once and write once | A length of a packet queue in a unit of byte |
| CREDIT | 21 | Read once and write once | Read once and write once | A quantity of credits of a packet queue in a unit of byte |
| PKT_NUM | 22 | Read once and write once | Read once and write once | A quantity of packets in a packet queue |
| TAIL_IN_CACHE | 1 | Read once and write once | Read once and write once | It indicates whether a queue tail PD in a PD queue exists in a cache (1 indicates that the queue tail PD in the PD queue exists in the cache) |

TABLE 4

| Name | Length (in bits) | Access times Enqueuing | Access times Dequeuing | Remarks |
|---|---|---|---|---|
| ADDR_TYPE | 1 | Write once | Read once | An address type, where 1 indicates an on-chip cache, and 0 indicates an off-chip cache |
| ADDR | 27 | Write once | Read once | An address of a packet in a packet cache |
| P_LEN | 14 | Write once | Read once | A packet length |
| TIME_STAMP | 10 | Write once | Read once | A packet enqueuing timestamp |
| PARITY | 2 | Write once | Read once | A parity bit |
| Total | 54 | | | |

Optionally, in some embodiments of the present invention, the queue management method further includes: if the credit of the first packet queue is greater than or equal to the first threshold, and the capacity of the available storage space in the SRAM is less than the second threshold, changing the state of the first packet queue to a third state; and adding the first packet queue in the third state to the to-be-activated packet queue set.

Specifically, the state of the first packet queue further includes the third state. If the credit of the first packet queue is greater than or equal to the first threshold, and the available storage space in the SRAM is less than the second threshold, the state of the first packet queue is changed to the third state. The first packet queue is added to the to-be-activated packet queue set. In this case, the to-be-activated packet queue set is non-empty.

Optionally, in some embodiments of the present invention, the queue management method further includes: determining whether a to-be-enqueued packet in a second packet queue meets a preset fast packet identification condition; and if the to-be-enqueued packet does not meet the preset fast packet identification condition, writing a PD of the to-be-enqueued packet to the DRAM; or if the to-be-enqueued packet meets the preset fast packet identification condition, writing a PD of the to-be-enqueued packet to the SRAM.

Specifically, a fast packet refers to a packet that is scheduled to dequeue shortly after enqueuing. In some embodiments of the present invention, an identification method may be: when a to-be-enqueued packet is detected in the second packet queue, generating a PD of the to-be-enqueued packet, reading a QD of the second packet queue from an allocated cache space in the SRAM, updating, according to the PD of the to-be-enqueued packet, the QD obtained by means of reading, and determining, according to an updated QD, whether the second packet queue meets the preset fast packet identification condition, where the fast packet identification condition meets the following formulas:

CREDIT-Q_LEN-P_LEN>threshold1(A), and

CREDIT-PKT_NUM-1>threshold2(B); where

CREDIT is a credit of the second packet queue, Q_LEN is a length of the second packet queue, P_LEN is a length of the to-be-enqueued packet, PKT_NUM is a quantity of packets in the second packet queue, threshold1 is a threshold of the credit of the second packet queue, and threshold2 is a threshold of the credit of the second packet queue. Formula A is applicable to a credit-based scheduler, and formula B is applicable to a packet-based scheduler.

Figure 4:
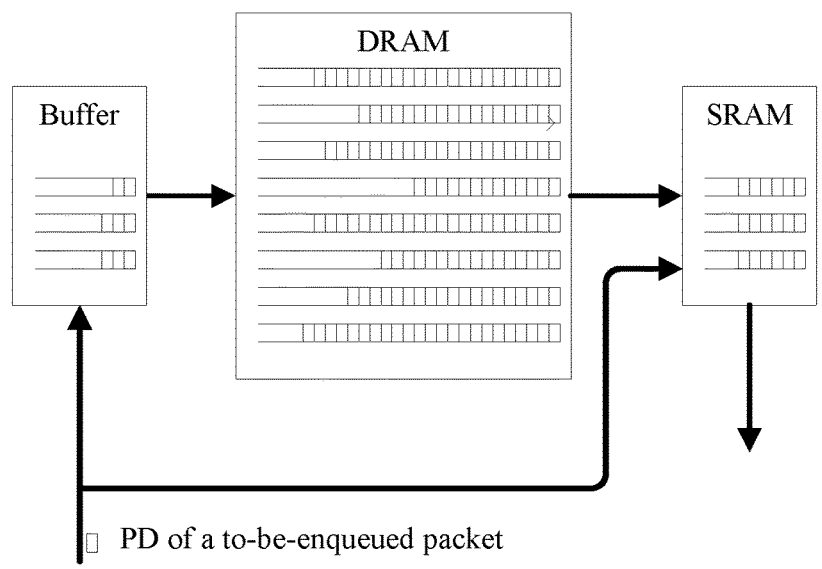
FIG. 4 is a schematic diagram of fast packet identification according to an embodiment of the present invention.

For example, referring to FIG. 4, a DRAM is disposed outside the traffic management chip, and an SRAM and a Buffer are disposed on the chip. A state of the second packet queue is the second state, some PDs in a PD queue corresponding to the second packet queue are stored in the DRAM and the other PDs in the queue are stored in the SRAM, or the entire PD queue is stored in the SRAM. The Buffer is used to buffer a PD written to the DRAM, and an organizational form of the Buffer may be an FIFO structure.

For a write request for writing a PD to the DRAM, load balancing control is performed to ensure that PDs that are written are evenly distributed to different banks in the DRAM. The SRAM disposed on the chip is configured to store some or all of PDs in the PD queue of the second packet queue, and the second packet queue reads, by means of prefetching, a PD from the DRAM into the SRAM, to improve efficiency of a bus of the DRAM. In addition, fast packet identification is performed on the to-be-enqueued packet in the second packet queue. When the to-be-enqueued packet is identified as a fast packet, the PD of the to-be-enqueued packet bypasses the DRAM, and is directly written to the SRAM to wait for dequeuing scheduling. If the to-be-enqueued packet is not a fast packet, the PD of the to-be-enqueued packet is buffered by using the Buffer and written to the DRAM.

It may be learned from the foregoing that in this embodiment of the present invention, a fast packet identification mechanism is introduced, and after a to-be-enqueued packet is identified as a fast packet, a PD corresponding to the to-be-enqueued packet bypasses a DRAM and directly enters an SRAM to wait for scheduling. In this way, dequeuing efficiency of a fast packet can be effectively improved.

Optionally, in some embodiments of the present invention, the DRAM includes multiple storage banks banks, multiple PD queues corresponding to multiple packet queues are stored in the DRAM, multiple queue heads of the multiple PD queues are separately stored in multiple banks, the multiple queue heads correspond one-to-one to the multiple banks, and the multiple PD queues correspond one-to-one to the multiple queue heads.

Specifically, the DRAM includes the multiple storage banks banks, the multiple PD queues corresponding to the multiple packet queues are stored in the DRAM, the multiple queue heads of the multiple PD queues are respectively stored in multiple banks, the multiple queue heads correspond one-to-one to the multiple banks, and the multiple PD queues correspond one-to-one to the multiple queue heads.

For example, a structure of the DRAM in this embodiment is shown in FIG. 4. The DRAM is a macro cell MCELL array with Y rows and X columns, one PD is stored in each macro cell, each column of MCELLs is one bank, a quantity of banks in the DRAM is X, and M rows of MCELLs form one memory block (BLOCK). M is an integer between 0 and Y, M is an integral power of 2, and a bit that indicates a busy/idle state is set in a BITMAP in each BLOCK. For example, when a BLOCK is occupied, a corresponding bit is set to 1, and when a BLOCK is available, a corresponding bit is set to 0. In addition, each memory block is associated with a NEXT_PTR pointer and a VOID_PTR pointer, where the NEXT_PTR pointer points to a next memory block, the VOID_PTR pointer points to the first void macro cell MCELL in the memory block, and data of all macro cells following the void macro cell are void. Once the macro cell to which the VOID_PTR-1 pointer points is read during a read operation, recycling of the memory block is triggered. One memory block can be allocated to and occupied by only one queue, PDs of each queue are sequentially stored in a memory block to form a singly linked list, and singly linked lists in a same memory block are connected by using a NEXT_PTR pointer and a VOID_PTR pointer.

A size of a management memory required for managing the DRAM is calculated as follows: Quantity of memory blocks*(1+NEXT_PTR bit width+VOID_PTR bit width). For example, for a packet queue at a rate of 100 Gbps, if each BLOCK includes eight rows of macro cells MCELLs (that is, M=8), a memory capacity required for managing the DRAM is approximately 2*256K*(1+26)=14.15M bits; if each BLOCK includes 16 rows of macro cells MCELLs (that is, M=16), a size of the management memory is 2*128K*(1+28)=7.424M bits. Fewer rows of macro cells MCELLs included in each BLOCK indicates more refined management of the DRAM and a larger management memory that is required. During an implementation process, a value of M may be set according to an actual requirement.

A type T is assigned to each memory block, a value of T is obtained by means of a modulo operation performed on a quantity X of columns of the memory block by using a sequence number of the memory block, and an offset of an address of a start macro cell (MCELL) of the memory block relative to an address of the memory block is T. For example, for a memory block I*X+0/2/3/ . . . /X, a type is 0/1/2/3/ . . . /X−1/VX, and a start MCELL macro cell is located in bank 0/1/2/3/ . . . /X−1/X, where I is an integer.

Optionally, in some embodiments of the present invention, the queue management method further includes: executing a dequeue operation on at least two packet queues in the multiple packet queues according to the multiple queue heads stored in the multiple banks.

Optionally, in some embodiments of the present invention, the queue management method further includes: executing a dequeue operation on at least two PD queues in the multiple PD queues, where after the dequeue operation is performed, the at least two PD queues separately include at least two new queue heads; and if the at least two new queue heads are stored in a same bank, and at least two dequeuing requests are received, placing the at least two dequeuing requests in a dequeuing request queue corresponding to the same bank, and using the dequeuing request queue to respond to the at least two dequeuing requests, where the at least two dequeuing requests correspond one-to-one to the at least two PD queues.

Specifically, the traffic management chip maintains at least multiple packet queues, and each packet queue is corresponding to one PD queue. A dequeue operation needs to be performed on at least two PD queues in multiple PD queues. After a dequeue operation is performed, the at least two PD queues separately include at least two new queue heads.

For example, the traffic management chip maintains 512×1024 packet queues, and needs to perform a dequeue operation on PD queues corresponding to three packet queues in the 512×1024 packet queues. A packet queue 1 is corresponding to a PD queue 1, a packet queue 2 is corresponding to a PD queue 2, a packet queue 3 is corresponding to a PD queue 3, and each PD queue includes eight PDs. It is assumed that a dequeue operation needs to be performed on the first two PDs in the PD queue 1; then the third PD in the PD queue 1 becomes a new queue head. It is assumed that a dequeue operation needs to be performed on a queue head of the PD queue 2; then the second PD in the PD queue 2 becomes a new queue head. It is assumed that a dequeue operation needs to be performed on the first three PDs in the PD queue 3; then the fourth PD in the PD queue 3 becomes a new queue head.

Specifically, if the at least two new queue heads are stored in the same bank in the DRAM, and the at least two dequeuing requests are received, the at least two dequeuing requests are placed in the dequeuing request queue corresponding to the same bank, where each bank in the DRAM is corresponding to one dequeuing request queue; the dequeuing request queue is used to respond to the at least two dequeuing requests, and dequeuing requests in the dequeuing request queue are sequentially processed, according to a first in first out sequence, to avoid congestion in the DRAM.

For example, new queue heads of PD queue 1, PD queue 2, and PD queue 3 are all located in a bank1 in the DRAM. The three PD queues simultaneously receive dequeuing requests, and the three dequeuing requests are placed in a dequeuing request queue. A sequence of the placing may be randomly arranged, or arranged according to sequence numbers of the PD queues. The traffic management chip sequentially reads, according to a first in first out sequence, the dequeuing requests in the dequeuing request queue, and processes the dequeuing requests, to avoid congestion in the bank1 in the DRAM.

Figure 5:
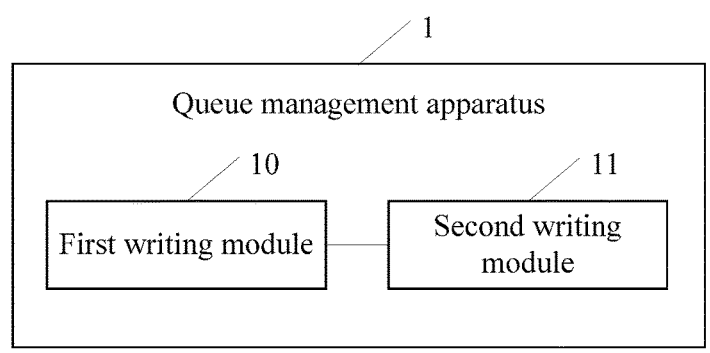
FIG. 5 is a schematic structural diagram of a queue management apparatus according to an embodiment of the present invention.

Referring to FIG. 5, FIG. 5 is a schematic structural diagram of a queue management apparatus according to an embodiment of the present invention. In this embodiment of the present invention, the queue management apparatus 1 includes a first writing module 10 and a second writing module 11. The queue management apparatus 1 may be configured to perform the method shown in FIG. 1. For meanings and examples of terms involved in this embodiment, refer to the embodiment corresponding to FIG. 1. Details are not described herein again.

The first writing module 10 is configured to write a PD queue to a DRAM, where the PD queue includes multiple PDs, and the multiple PDs correspond one-to-one to multiple packets included in a first packet queue.

The second writing module 11 is configured to write at least one PD in the PD queue to an SRAM, where the at least one PD includes a queue head of the PD queue.

For example, the first writing module 10 may be a memory controller configured to control the DRAM. The second writing module 11 may be a memory controller configured to control the SRAM.

Optionally, in some embodiments of the present invention, the queue management apparatus 1 further includes: a first determining module, configured to: after the first writing module writes the PD queue to the DRAM, and before the second writing module writes the at least one PD in the PD queue to the SRM, determine that a credit of the first packet queue is greater than or equal to a preset first threshold, and a capacity of available storage space in the SRAM is greater than or equal to a preset second threshold; where the second writing module is specifically configured to: if the capacity of the available storage space in the SRAM is greater than or equal to the second threshold, write the at least one PD in the PD queue to the SRAM.

Optionally, the first determining module is further configured to: determine that a to-be-activated packet queue set is empty, where the to-be-activated packet queue set includes a packet queue that meets a preset waiting-for-activation condition, and the waiting-for-activation condition is that when the determining is performed, a credit of a packet queue is greater than or equal to the first threshold, and when the determining is performed, the capacity of the available storage space in the SRAM is less than the second threshold; and the second writing module is specifically configured to: if the capacity of the available storage space in the SRAM is greater than or equal to the second threshold, and the to-be-activated packet queue set is empty, write the at least one PD in the PD queue to the SRAM.

Optionally, the first determining module is further configured to: determine that a to-be-activated packet queue set is non-empty, where the to-be-activated packet queue set includes a packet queue that meets a preset waiting-for-activation condition, and the waiting-for-activation condition is that when the determining is performed, a credit of a packet queue is greater than or equal to the first threshold, and when the determining is performed, the capacity of the available storage space in the SRAM is less than the second threshold; and the second writing module is specifically configured to: if the capacity of the available storage space in the SRAM is greater than or equal to the second threshold, and the first packet queue is a packet queue with a highest priority in the to-be-activated packet queue set, write the at least one PD in the PD queue to the SRAM.

Optionally, the first writing module is further configured to: identify a state of the first packet queue as a first state; the first determining module is further configured to: change the state of the first packet queue to a second state; and the second writing module is specifically configured to write the at least one PD in the PD queue to the SRAM based on an indication of the second state.

Optionally, in some embodiments of the present invention, the queue management apparatus 1 further includes: a modifying module, configured to: if the credit of the first packet queue is greater than or equal to the first threshold, and the capacity of the available storage space in the SRAM is less than the second threshold, change the state of the first packet queue to a third state; and an adding module, configured to add the first packet queue in the third state to the to-be-activated packet queue set.

Optionally, the queue management apparatus 1 further includes: a second determining module, configured to determine whether a to-be-enqueued packet in a second packet queue meets a preset fast packet identification condition; and a third writing module, configured to: if the second determining module determines that the to-be-enqueued packet does not meet the preset fast packet identification condition, write a PD of the to-be-enqueued packet to the DRAM; or a fourth writing module, configured to: if the second determining module determines that the to-be-enqueued packet meets the preset fast packet identification condition, write a PD of the to-be-enqueued packet to the SRAM.

Optionally, the DRAM includes multiple banks, multiple PD queues corresponding to multiple packet queues are stored in the DRAM, multiple queue heads of the multiple PD queues are respectively stored in multiple banks, the multiple queue heads correspond one-to-one to the multiple banks, and the multiple PD queues correspond one-to-one to the multiple queue heads.

Optionally, the queue management apparatus 1 further includes: a first dequeuing module, configured to perform a dequeue operation on at least two packet queues in the multiple packet queues according to the multiple queue heads stored in the multiple banks.

Optionally, in some embodiments of the present invention, the queue management apparatus 1 further includes: a second dequeuing module, configured to perform a dequeue operation on at least two PD queues in the multiple PD queues, where after the dequeue operation is performed, the at least two PD queues separately include at least two new queue heads; and a responding module, configured to: if the at least two new queue heads are stored in a same bank, and at least two dequeuing requests are received, place the at least two dequeuing requests in a dequeuing request queue corresponding to the same bank, and use the dequeuing request queue to respond to the at least two dequeuing requests, where the at least two dequeuing requests correspond one-to-one to the at least two PD queues.

This embodiment of the present invention and the foregoing method embodiment derive from a same idea, and technical effects brought by this embodiment of the present invention and the foregoing method embodiment are also the same. For details, refer to the descriptions of the foregoing method embodiment, and details are not described herein again.

Figure 6:
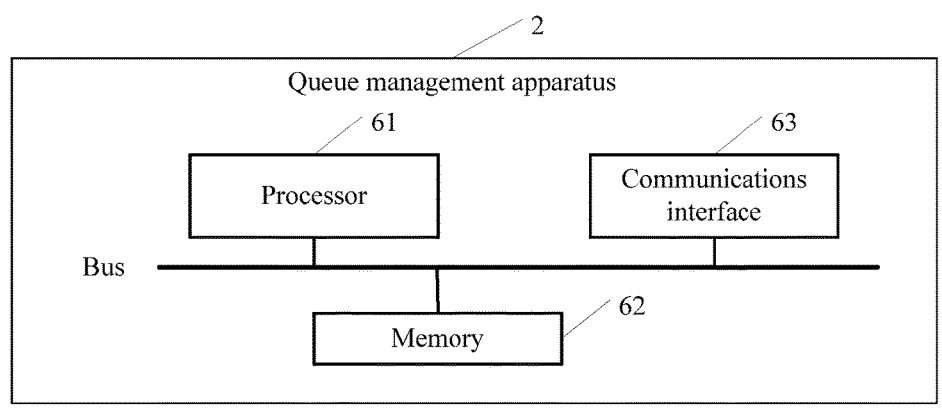
FIG. 6 is another schematic structural diagram of a queue management apparatus according to an embodiment of the present invention.

Referring to FIG. 6, FIG. 6 is a schematic structural diagram of a queue management apparatus according to an embodiment of the present invention. In this embodiment of the present invention, the queue management apparatus 2 includes a processor 61, a memory 62, and a communications interface 63. The communications interface 63 is configured to communicate with an external device. There may be one or more processors 61 in a queue management apparatus. There is one processor 61 in FIG. 6. In some embodiments of the present invention, the processor 61, the memory 62, and the communications interface 63 may be connected by using a bus or in another manner. In FIG. 6, the processor 61, the memory 62, and the communications interface 63 are connected by using a bus. The queue management apparatus 2 may be configured to perform the method shown in FIG. 1. For meanings and examples of terms involved in this embodiment, refer to the embodiment corresponding to FIG. 1. Details are not described herein again.

Program code is stored in the memory 62. The processor 61 is configured to invoke the program code stored in the memory 62, to perform the following operations: writing a PD queue to a DRAM, where the PD queue includes multiple PDs, and the multiple PDs correspond one-to-one to multiple packets included in a first packet queue; and writing at least one PD in the PD queue to an SRAM, where the at least one PD includes a queue head of the PD queue.

In some embodiments of the present invention, the processor 61 is further configured to: after the PD queue is written to the DRAM, and before the at least one PD in the PD queue is written to the SRAM, perform the following operation: determining that a credit of the first packet queue is greater than or equal to a preset first threshold, and a capacity of available storage space in the SRAM is greater than or equal to a preset second threshold.

That the processor 61 performs the writing at least one PD in the PD queue to an SRAM specifically includes: if the capacity of the available storage space in the SRAM is greater than or equal to the second threshold, writing the at least one PD in the PD queue to the SRAM.

In some embodiments of the present invention, that the processor 61 performs the determining that a credit of the first packet queue is greater than or equal to a preset first threshold, and a capacity of available storage space in the SRAM is greater than or equal to a preset second threshold further includes: determining that a to-be-activated packet queue set is empty, where the to-be-activated packet queue set includes a packet queue that meets a preset waiting-for-activation condition, and the waiting-for-activation condition is that when the determining is performed, a credit of a packet queue is greater than or equal to the first threshold, and when the determining is performed, the capacity of the available storage space in the SRAM is less than the second threshold.

That the processor 61 performs the writing at least one PD in the PD queue to an SRAM specifically includes: if the capacity of the available storage space in the SRAM is greater than or equal to the second threshold, and the to-be-activated packet queue set is empty, writing the at least one PD in the PD queue to the SRAM.

In some embodiments of the present invention, that the processor 61 performs the determining that a credit of the first packet queue is greater than or equal to a preset first threshold, and a capacity of available storage space in the SRAM is greater than or equal to a preset second threshold further includes: determining that a to-be-activated packet queue set is non-empty, where the to-be-activated packet queue set includes a packet queue that meets a preset waiting-for-activation condition, and the waiting-for-activation condition is that when the determining is performed, a credit of a packet queue is greater than or equal to the first threshold, and when the determining is performed, the capacity of the available storage space in the SRAM is less than the second threshold.

That the processor 61 performs the writing at least one PD in the PD queue to an SRAM specifically includes: if the capacity of the available storage space in the SRAM is greater than or equal to the second threshold, and the first packet queue is a packet queue with a highest priority in the to-be-activated packet queue set, writing the at least one PD in the PD queue to the SRAM.

In some embodiments of the present invention, that the processor 61 performs the writing a PD queue to a DRAM further includes: identifying a state of the first packet queue as a first state; that the processor 61 performs the determining that a credit of the first packet queue is greater than or equal to a preset first threshold, and a capacity of available storage space in the SRAM is greater than or equal to a preset second threshold further includes: changing the state of the first packet queue to a second state; and that the processor 61 performs the writing at least one PD in the PD queue to an SRAM specifically includes: writing the at least one PD in the PD queue to the SRAM based on an indication of the second state.

In some embodiments of the present invention, the processor 61 is further configured to perform the following operations: if the credit of the first packet queue is greater than or equal to the first threshold, and the capacity of the available storage space in the SRAM is less than the second threshold, changing the state of the first packet queue to a third state; and adding the first packet queue in the third state to the to-be-activated packet queue set.

In some embodiments of the present invention, the processor 61 is further configured to perform the following operations: determining whether a to-be-enqueued packet in a second packet queue meets a preset fast packet identification condition; and if the to-be-enqueued packet does not meet the preset fast packet identification condition, writing a PD of the to-be-enqueued packet to the DRAM; or if the to-be-enqueued packet meets the preset fast packet identification condition, writing a PD of the to-be-enqueued packet to the SRAM.

In some embodiments of the present invention, the DRAM includes multiple banks, multiple PD queues corresponding to multiple packet queues are stored in the DRAM, multiple queue heads of the multiple PD queues are separately stored in multiple banks, the multiple queue heads correspond one-to-one to the multiple banks, and the multiple PD queues correspond one-to-one to the multiple queue heads.

In some embodiments of the present invention, the processor 61 is further configured to perform the following operation: executing a dequeue operation on at least two packet queues in the multiple packet queues according to the multiple queue heads stored in the multiple banks.

In some embodiments of the present invention, the processor 61 is further configured to perform the following operations: executing a dequeue operation on at least two PD queues in the multiple PD queues, where after the dequeue operation is performed, the at least two PD queues separately include at least two new queue heads; and if the at least two new queue heads are stored in a same bank, and at least two dequeuing requests are received, placing the at least two dequeuing requests in a dequeuing request queue corresponding to the same bank, and using the dequeuing request queue to respond to the at least two dequeuing requests, where the at least two dequeuing requests correspond one-to-one to the at least two PD queues.

In the foregoing technical solutions, a PD queue corresponding to a first packet queue is written to a DRAM, and at least one PD that is in the PD queue and includes a queue head is written to an SRAM. Therefore, the at least one PD in the PD queue corresponding to the first packet queue is stored in the SRAM. Performing a dequeue operation on the first packet queue may be implemented by performing a read operation on the PD queue. If the first packet queue is an FIFO queue, performing the dequeue operation on the first packet queue may be implemented by executing a read operation on the queue head of the PD queue. The queue head of the PD queue is stored in the SRAM, and executing a read operation on the queue head of the PD queue is implemented by performing a read operation on the SRAM. A rate of performing a read operation on the SRAM is not restricted by a property of the DRAM. Therefore, in the foregoing technical solutions, dequeuing efficiency of a PD queue is relatively high, which helps to improve dequeuing efficiency of a first packet queue.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The storage medium may include: a magnetic disk, an optical disc, a read-only memory (ROM for short), or a random access memory (RAM for short).

What is disclosed above is merely example embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A method, comprising:
   writing a packet descriptor (PD) queue to a dynamic random access memory (DRAM), wherein the PD queue comprises a plurality of PDs, and the plurality of PDs correspond one-to-one to a plurality of packets comprised in a first packet queue;
   determining that a credit of the first packet queue is greater than or equal to a preset first threshold, and a capacity of available storage space in a static random access memory (SRAM) is greater than or equal to a preset second threshold; and
   when the capacity of the available storage space in the SRAM is greater than or equal to the second threshold, writing a PD of the plurality of PDs in the PD queue to the SRAM, wherein the PD of the plurality of PDs comprises a queue head of the PD queue.

2. The method according to claim 1, wherein determining that the credit of the first packet queue is greater than or equal to a preset first threshold, and that the capacity of available storage space in the SRAM is greater than or equal to a preset second threshold, comprises:
   determining that a to-be-activated packet queue set is empty, wherein the to-be-activated packet queue set provides a queue set for any candidate packet queue that meets a preset waiting-for-activation condition, and the waiting-for-activation condition is that, when the determining is performed, a credit of the candidate packet queue is greater than or equal to the first threshold, and when the determining is performed, the capacity of the available storage space in the SRAM is less than the second threshold;

wherein writing the PD of the plurality of PDs in the PD queue to the SRAM comprises:
when the capacity of the available storage space in the SRAM is greater than or equal to the second threshold, and the to-be-activated packet queue set is empty, writing the PD of the plurality of PDs in the PD queue to the SRAM.

3. The method according to claim 2, wherein:
writing the PD queue to the DRAM further comprises identifying a state of the first packet queue as a first state;
determining that the credit of the first packet queue is greater than or equal to the preset first threshold, and that the capacity of available storage space in the SRAM is greater than or equal to the preset second threshold, comprises changing the state of the first packet queue to a second state; and
writing the PD of the plurality of PDs in the PD queue to the SRAM comprises:
writing the PD of the plurality of PDs in the PD queue to the SRAM based on an indication of the second state.

4. The method according to claim 3, further comprising:
when the credit of the first packet queue is greater than or equal to the first threshold, and the capacity of the available storage space in the SRAM is less than the second threshold, changing the state of the first packet queue to a third state; and
adding the first packet queue in the third state to the to-be-activated packet queue set.

5. The method according to claim 1, wherein determining that the credit of the first packet queue is greater than or equal to the preset first threshold, and that the capacity of available storage space in the SRAM is greater than or equal to the preset second threshold, comprises:
determining that a to-be-activated packet queue set is non-empty, wherein the to-be-activated packet queue set provides a queue set for any candidate packet queue that meets a preset waiting-for-activation condition, and the waiting-for-activation condition is that when the determining is performed, a credit of the candidate packet queue is greater than or equal to the first threshold, and when the determining is performed, the capacity of the available storage space in the SRAM is less than the second threshold;
wherein writing the PD of the plurality of PDs in the PD queue to the SRAM comprises, when the capacity of the available storage space in the SRAM is greater than or equal to the second threshold, and the first packet queue is a packet queue with a highest priority in the to-be-activated packet queue set, writing the PD of the plurality of PDs in the PD queue to the SRAM.

6. The method according to claim 1, further comprising:
determining whether a to-be-queued packet in a second packet queue meets a preset fast packet identification condition;
when the to-be-queued packet does not meet the preset fast packet identification condition, writing a PD of the to-be-queued packet to the DRAM; and
when the to-be-queued packet meets the preset fast packet identification condition, writing a PD of the to-be-queued packet to the SRAM.

7. The method according to claim 1, wherein the DRAM comprises a plurality of banks, a plurality of PD queues corresponding to a plurality of packet queues are stored in the DRAM, a plurality of queue heads of the plurality of PD queues are separately stored in a plurality of banks, the plurality of queue heads correspond one-to-one to the plurality of banks, and the plurality of PD queues correspond one-to-one to the plurality of queue heads.

8. The method according to claim 7, further comprising:
executing a de-queueing operation on at least two packet queues in the plurality of packet queues according to the plurality of queue heads stored in the plurality of banks.

9. The method according to claim 7, further comprising:
executing a de-queueing operation on at least two PD queues in the plurality of PD queues, wherein after the de-queueing operation is performed, the at least two PD queues comprise a plurality of new queue heads; and
when the plurality of new queue heads are stored in a same bank, and a plurality of de-queuing requests are received, placing the plurality of de-queuing requests in a de-queuing request queue corresponding to the same bank, and using the de-queuing request queue to respond to the plurality of de-queuing requests, wherein the plurality of de-queuing requests correspond one-to-one to the at least two PD queues.

10. An apparatus, comprising:
a processor; and
a computer-readable storage medium storing a program to be executed by the processor, the program including instructions for:
writing a packet descriptor (PD) queue to a dynamic random access memory (DRAM), wherein the PD queue comprises a plurality of PDs, and the plurality of PDs correspond one-to-one to a plurality of packets comprised in a first packet queue;
determining that a credit of the first packet queue is greater than or equal to a preset first threshold, and that a capacity of available storage space in a static random access memory (SRAM) is greater than or equal to a preset second threshold; and
when the capacity of the available storage space in the SRAM is greater than or equal to the second threshold, writing, to the SRAM, a PD of the plurality of PDs in the PD queue, wherein the PD of the plurality of PDs comprises a queue head of the PD queue.

11. The apparatus according to claim 10, wherein the program further includes instructions for:
determining that a to-be-activated packet queue set is empty, wherein the to-be-activated packet queue set provides a queue set for any candidate packet queue that meets a preset waiting-for-activation condition, and the waiting-for-activation condition is that when the determining is performed, a credit of the candidate packet queue is greater than or equal to the first threshold, and when the determining is performed, the capacity of the available storage space in the SRAM is less than the second threshold; and
when the capacity of the available storage space in the SRAM is greater than or equal to the second threshold, and the to-be-activated packet queue set is empty, writing the PD of the plurality of PDs in the PD queue to the SRAM.

12. The apparatus according to claim 11, wherein the program further includes instructions for:
identifying a state of the first packet queue as a first state;
changing the state of the first packet queue to a second state; and writing the PD of the plurality of PDs in the PD queue to the SRAM based on an indication of the second state.

13. The apparatus according to claim 10, wherein the program further includes instructions for:
    determining that a to-be-activated packet queue set is non-empty, wherein the to-be-activated packet queue set provides a queue set for any candidate packet queue that meets a preset waiting-for-activation condition, and the waiting-for-activation condition is that when the determining is performed, a credit of the candidate packet queue is greater than or equal to the first threshold, and when the determining is performed, the capacity of the available storage space in the SRAM is less than the second threshold; and
    when the capacity of the available storage space in the SRAM is greater than or equal to the second threshold, and the first packet queue is a packet queue with a highest priority in the to-be-activated packet queue set, writing the PD of the plurality of PDs in the PD queue to the SRAM.

14. The apparatus according to claim 13, wherein the program further includes instructions for:
    when the credit of the first packet queue is greater than or equal to the first threshold, and the capacity of the available storage space in the SRAM is less than the second threshold, changing the state of the first packet queue to a third state; and
    adding the first packet queue in the third state to the to-be-activated packet queue set.

15. The apparatus according to claim 10, wherein the program further includes instructions for:
    determining whether a to-be-queued packet in a second packet queue meets a preset fast packet identification condition;
    when it is determined that the to-be-queued packet does not meet the preset fast packet identification condition, writing a PD of the to-be-queued packet to the DRAM; and
    when it is determined that the to-be-queued packet meets the preset fast packet identification condition, writing a PD of the to-be-queued packet to the SRAM.

16. The apparatus according to claim 10, wherein the DRAM comprises a plurality of storage banks, a plurality of PD queues corresponding to a plurality of packet queues are stored in the DRAM, a plurality of queue heads of the plurality of PD queues are separately stored in the plurality of storage banks, the plurality of queue heads correspond one-to-one to the plurality of storage banks, and the plurality of PD queues correspond one-to-one to the plurality of queue heads.

17. The apparatus according to claim 16, wherein the program further includes instructions for:
    performing a de-queueing operation on at least two packet queues in the plurality of packet queues according to the plurality of queue heads stored in the plurality of storage banks.

18. The apparatus according to claim 16, wherein the program further includes instructions for:
    performing a de-queueing operation on at least two PD queues in the plurality of PD queues, wherein after the de-queueing operation is performed, the at least two PD queues separately comprise at least two new queue heads; and
    when the at least two new queue heads are stored in a same bank, and at least two de-queuing requests are received, placing the at least two de-queuing requests in a de-queuing request queue corresponding to the same bank, and using the de-queuing request queue to respond to the at least two de-queuing requests, wherein the at least two de-queuing requests correspond one-to-one to the at least two PD queues.

* * * * *